(12) United States Patent
Jones

(10) Patent No.: US 6,622,487 B2
(45) Date of Patent: Sep. 23, 2003

(54) FLUID FLOW CONTROL VALVE

(75) Inventor: Alan R Jones, Derby (GB)

(73) Assignee: Rolls-Royce plc, London (GB)

( * ) Notice: Subject to any disclaimer, the term of this patent is extended or adjusted under 35 U.S.C. 154(b) by 91 days.

(21) Appl. No.: 10/022,740

(22) Filed: Dec. 20, 2001

(65) Prior Publication Data

US 2002/0121080 A1 Sep. 5, 2002

(30) Foreign Application Priority Data

Jan. 16, 2001 (GB) .............................................. 0101096

(51) Int. Cl.⁷ .............................................. F02C 7/232
(52) U.S. Cl. .................................... 60/734; 251/129.06
(58) Field of Search .......................... 60/725, 734, 740, 60/741; 251/129.02, 129.06

(56) References Cited

U.S. PATENT DOCUMENTS

| 5,249,117 A | | 9/1993 | Greenough |
| 6,026,847 A | * | 2/2000 | Reinicke et al. ........ 251/129.06 |
| 6,170,766 B1 | * | 1/2001 | Focke et al. ........... 251/129.06 |
| 6,279,842 B1 | * | 8/2001 | Spain .................... 251/129.06 |

FOREIGN PATENT DOCUMENTS

| GB | 2 201 492 A | 9/1988 |
| GB | 2 203 518 A | 10/1988 |
| JP | 2 237 477 AB | 9/1990 |

* cited by examiner

*Primary Examiner*—Louis J. Casaregola
(74) *Attorney, Agent, or Firm*—W. Warren Taltavull; Manelli Denison & Selter PLLC

(57) ABSTRACT

A fluid flow control valve (60) comprises a valve seat (62) and a valve stem (64) which is movable towards or away from the valve seat (62) to control the fluid flow through the valve (60). A magnetostrictive element (66) is arranged to move the valve stem (64) towards the valve seat (62) and a spring (68) is arranged to move the valve stem (64) away from the valve seat (62). A valve wall (70) encloses the valve seat (62), valve stem (64), spring (68) and magnetostrictive element (66). A magnetic coil (72), a keeper (74) and a permanent magnet (76) are arranged around the valve wall (70). The fluid flow control valve (60) is used to modulate the supply of fuel to a gas turbine engine combustion chamber to reduce combustion noise especially in premixed lean burn combustion chamber. The advantage is that there are no seals in the valve wall where leakage may occur and the valve is modular.

16 Claims, 5 Drawing Sheets

FLUID FLOW CONTROL VALVE

FIELD OF THE INVENTION

The present invention relates to a fluid flow control valve, either a liquid flow control valve or a gas flow control valve.

The present invention relates in particular to a fuel flow control valve for a combustion chamber, especially a premixed lean burn combustion chamber, of a gas turbine engine. The fuel may be a gas fuel or a liquid fuel.

BACKGROUND OF THE INVENTION

Combustion processes often generate noise, that is, they emit energy in the form of high frequency pressure perturbations. Combustion noise occurs in premixed lean burn combustion chambers of gas turbine engines. There is an energy interchange between the sound waves and the unsteady heat input to the combustion chamber which produces amplification of the combustion noise. This amplification of the combustion noise may result in sufficiently high amplitudes which may result in damage to the combustion chamber and gas turbine engine.

It has previously been proposed to reduce the combustion noise by controlling the unsteady heat release from the combustion chamber by modulation of the fuel supply about a mean level at a frequency, amplitude and phase shift determined from combustion noise pressure measurements. The fuel supply is modulated by a fluid flow control valve.

SUMMARY OF THE INVENTION

Accordingly the present invention seeks to provide a novel fluid flow control valve which reduces, preferably overcomes, the above mentioned problems.

Accordingly the present invention provides a fluid flow control valve comprising a valve seat, a valve stem, the valve seat has a passage therethrough for the flow of fluid, the valve stem and the valve seat are relatively movable towards or away from each other to control the fluid flow through the valve, a magnetostrictive element arranged to move the valve stem and the valve seat towards each other, biasing means to move the valve stem and the valve seat away from each other, a valve wall enclosing the valve stem, biasing means and magnetostrictive element, a magnetic coil arranged around the valve wall, a keeper arranged around the valve wall and a permanent magnet arranged around the valve wall.

Preferably the valve wall encloses [enclosing ] the valve seat.

Preferably the valve wall is cylindrical.

Preferably the valve seat, valve stem, magnetostrictive element, magnetic coil, permanent magnet, keeper and valve wall are arranged coaxially.

Preferably the biasing means comprises a spring, preferably a belleville spring.

Preferably the magnetostrictive element comprises an alloy of terbium, dysprosium and iron.

Preferably the valve wall comprises a low magnetic permeability material, preferably stainless steel or a titanium alloy. Preferably the stainless steel comprises 18 wt % chromium, 8 wt % nickel and balance iron, carbon and incidental impurities.

Preferably the permanent magnet is annular.

Preferably the keeper comprises magnetically soft iron or ferrite.

Preferably a cooling fluid is supplied through at least one passage between the valve wall and the magnetic coil to cool the valve.

Preferably the valve seat has a passage therethrough for the flow of the fluid and the magnetostrictive element has a passage therethrough for the flow of the fluid, the passage in the magnetostrictive element is in alignment with the passage in the valve seat such that the flow of fluid therethrough cools the valve.

Preferably the valve stem is movable towards or away from the valve seat to control the fluid flow through the valve, the magnetostrictive element is arranged to move the valve stem towards the valve seat, the biasing means is arranged to move the valve stem away from the valve seat.

The valve seat may be movable towards or away from the valve stem to control the fluid flow through the valve, a second magnetostrictive element is arranged to move the valve seat towards the valve stem, second biasing means to move the valve seat away from the valve stem, the valve wall also enclosing the second biasing means and the second magnetostrictive element, a second magnetic coil is arranged around the valve wall, a second keeper is arranged around the valve wall and a second permanent magnet is arranged around the valve wall.

BRIEF DESCRIPTION OF THE DRAWINGS

The present invention will be more fully described by way of example with reference to the accompanying drawings in which.

DETAILED DESCRIPTION OF THE INVENTION

Figure 1:
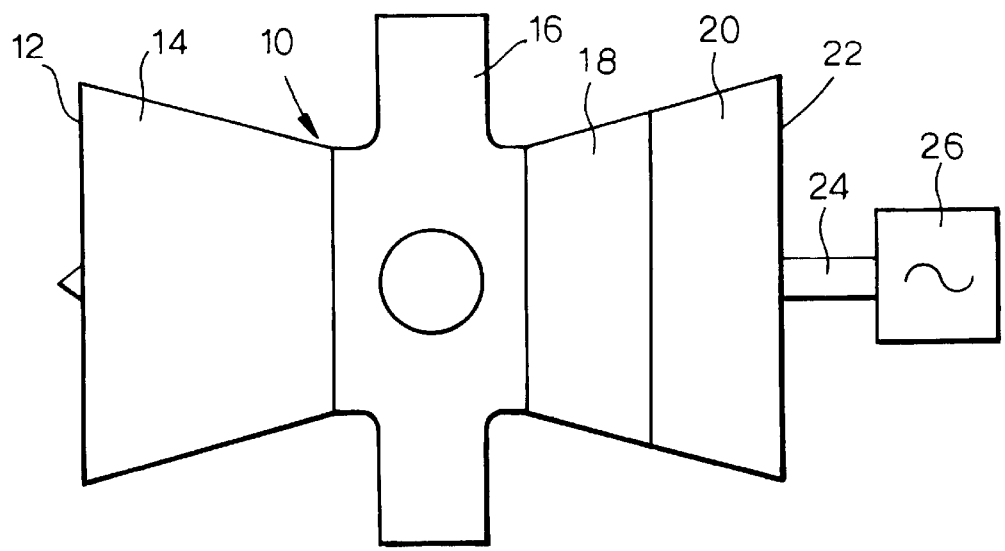
FIG. 1 shows a gas turbine engine having a fluid flow control valve according to the present invention.

An industrial gas turbine engine 10, as shown in FIG. 1, comprises an inlet 12, a compressor section 14, a combustion chamber assembly 16, a turbine section 18, a power turbine section 20, and an exhaust 22. The turbine section 18 is arranged to drive the compressor section 14 via one or more shafts (not shown). The power turbine section 20 is arranged to drive an electrical generator 26 via a shaft 24. However, the power turbine section may be arranged to provide drive for other purposes, for example a pump or to drive a propeller for a marine vessel. Alternatively the power turbine 20 may be dispensed with and the turbine section 18 may drive the electrical generator 26, etc. via a shaft.

Figure 2:
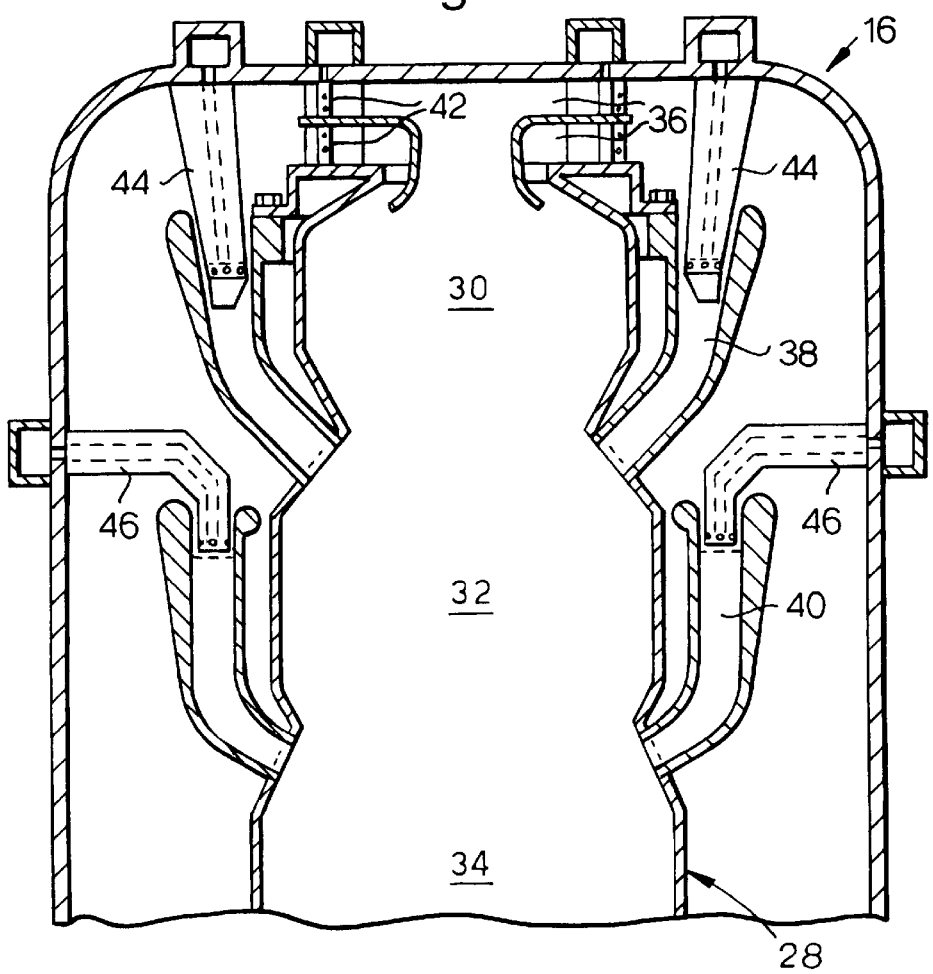
FIG. 2 is an enlarged cross-sectional view through a combustion chamber shown in FIG. 1.
Figure 3:
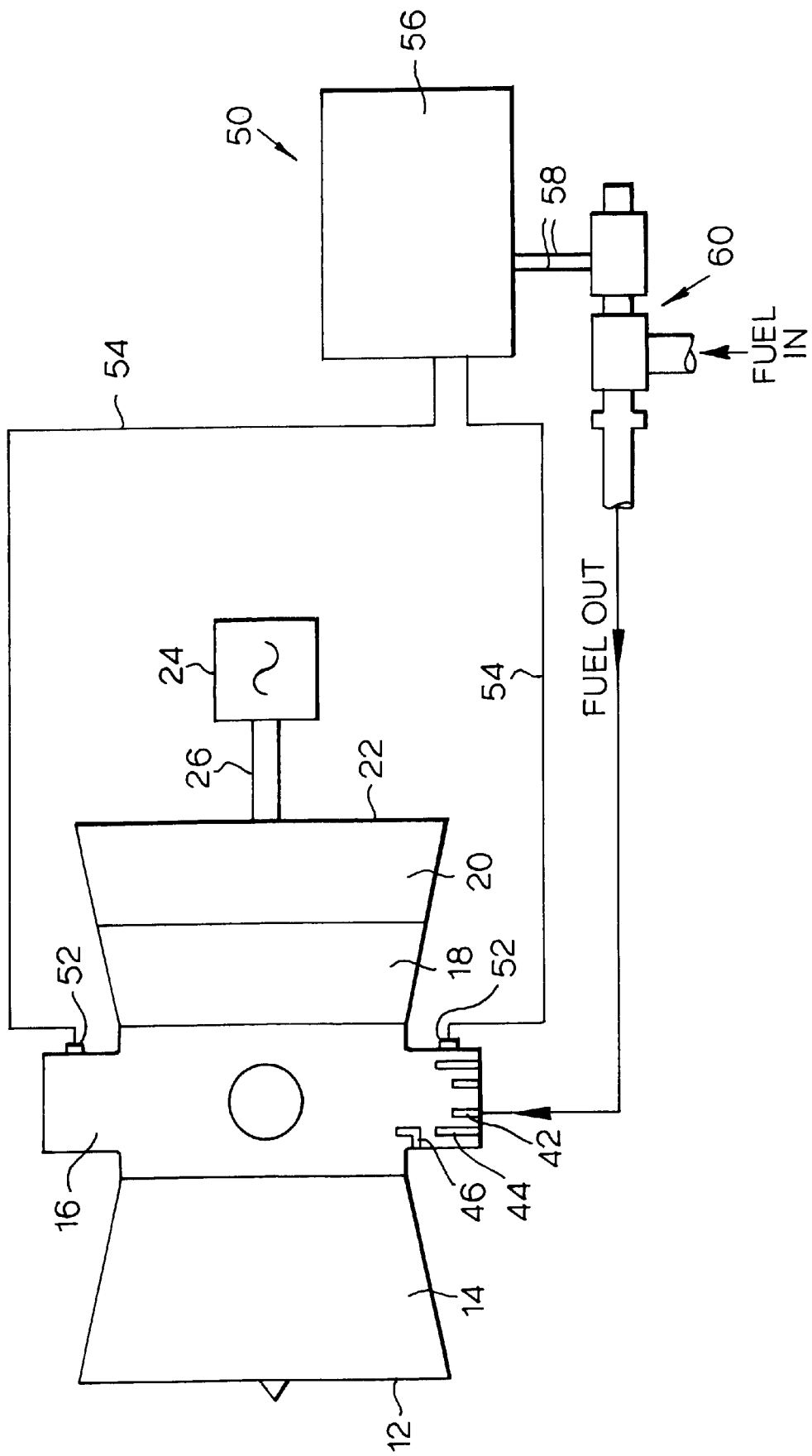
FIG. 3 is a diagrammatic arrangement of a system for controlling combustion noise including a fluid flow control valve according to the present invention.

The combustion chamber assembly 16 comprises a plurality of, for example nine, tubular combustion chambers 28, as shown in FIG. 2, arranged with their axes generally radially to the axis of the gas turbine engine 10. Each of the tubular combustion chambers 28 comprises a primary combustion zone 30, a secondary combustion zone 32 and a tertiary combustion zone 34 arranged in flow series. The products of the primary combustion zone 30 flow into the secondary combustion zone 32 and the products of the secondary combustion zone 32 flow into the tertiary combustion zone 34.

The primary combustion zone 30 is supplied with fuel and air from at least one primary fuel and air mixing duct 36. The secondary combustion zone 32 is supplied with fuel and air from at least one secondary fuel and air mixing duct 38 and the tertiary combustion zone 34 is supplied with fuel and air from at least one tertiary fuel and air mixing duct 40. A plurality of primary fuel injectors 42 supply fuel into the at least one primary fuel and air mixing duct 36. A plurality of secondary fuel injectors 44 supply fuel into the at least one secondary fuel and air mixing duct 38 and a plurality of tertiary fuel injectors 46 supply fuel into the at least one tertiary fuel and air mixing duct 40.

A system 50 for controlling combustion noise is provided. Each combustion chamber 28 has at least one pressure transducer 52, a fuel controller 56 and a fuel flow control valve 60. The at least one transducer 52 is arranged to measure the pressure in the combustion chamber 28 and the at least one pressure transducer 52 is arranged to send an electrical signal along electrical connection 54 to the fuel controller 56. The fuel controller 56 sends electrical signals along electrical connectors 58 to the fuel flow control valve 60 which controls the supply of fuel to the primary fuel injectors 42 of the combustion chamber 28.

Each fuel controller 56 analyses the electrical signals to determine the amplitude and frequency of combustion noise generated in the respective combustion chamber 28. Each fuel controller 56 sends electrical signals to the respective fuel flow control valve 60 so that the fuel flow control valve 60 modulates the fuel supplied to the fuel injectors 42. The fuel flow rate fluctuates about a mean flow rate at a frequency, amplitude and phase shift to reduce the combustion noise generated in the respective combustion chamber 28.

Alternatively the fuel flow control valve 60 of each combustion chamber 28 may control the supply of fuel to the secondary fuel injectors 44 or the tertiary fuel injectors 46. As a further alternative each combustion chamber 28 may have a first fuel flow control valve to control the flow of fuel to the primary fuel injectors 42, a second fuel flow control valve to control the flow of fuel to the secondary fuel injectors 44 and optionally a third fuel flow control valve to control the flow of fuel to the tertiary fuel injectors 46.

Figure 4:
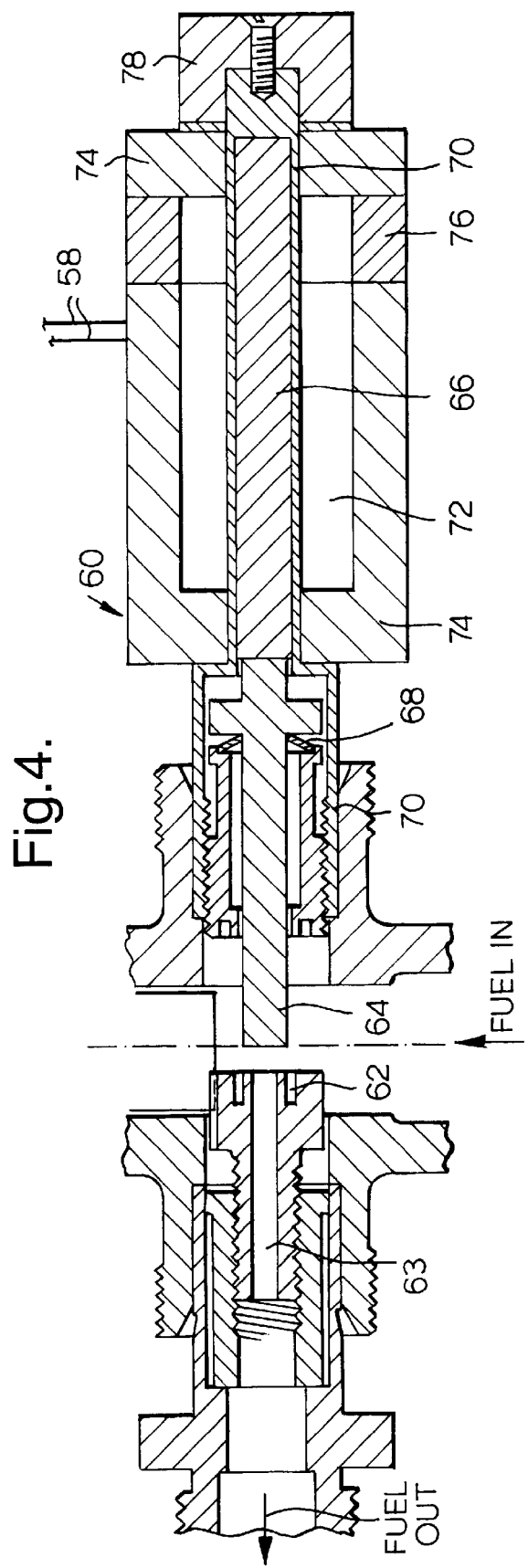
FIG. 4 is a cross-sectional view through a fluid flow control valve according to the present invention.

The fuel flow control valve 60, as shown more clearly in FIG. 4, comprises a valve seat 62 and a valve stem 64 which is movable towards or away from the valve seat 62 to control the fluid flow through the valve 60. A magnetostrictive element 66 is arranged to move the valve stem 64 towards the valve seat 62 and biasing means 68 is arranged to move the valve stem 64 away from the valve seat 62. A valve wall 70 encloses the valve seat 62, the valve stem 64, the biasing means 68 and the magnetostrictive element 66. A magnetic coil 72 is arranged around the valve wall 70, a keeper 74 is arranged around the valve wall 70 and a permanent magnet 76 is arranged around the valve wall 70. The valve seat 62 has a bore 63 for the flow of fuel into, or out of the fuel control valve 60. The biasing means 68 comprises a spring, preferably a belleville spring.

The valve wall 70 is cylindrical and the valve seat 62, valve stem 64 and magnetostrictive element 68 are arranged coaxially within the valve wall 70. The magnetic coil 72, the keeper 74 and the permanent magnet 76 are arranged coaxially around the valve wall 70. The magnetic coil 72, the keeper 74 and the permanent magnet 76 are annular. The magnetic coil 72, the keeper 74 and the permanent magnet 76 are arranged axially in alignment with the magnetostrictive element 66 so that changes in the magnetic field from the electromagnetic coil 72 produce changes in the axial length of the magnetostrictive element 66. The keeper 74 completes the DC magnetic circuit produced by the permanent magnet 76 and the AC magnetic circuit produced by the magnetic coil 72. The permanent magnet 76 produces a biasing magnetic field on the magnetostrictive element 66. The fluid flow control valve 60 is modular and comprises two modules. The valve wall 70, the magnetostrictive element 66, the valve stem 64, the biasing means 68 and the valve seat 62 form the first module. The magnetic coil 72, the keeper 74 and the permanent magnet 76 form the second module. An end cap 78 holds the second module onto the first module. If there is a fault either the whole unit may be replaced, or the end cap may be removed to allow the first or second module to be replaced.

The length of the magnetostrictive element 66 is arranged to be small enough so that the first vibrational mode of the magnetostrictive element 66 is above the required operational frequency of the fuel flow control valve 60.

The magnetostrictive element 66 comprises any suitable magnetostrictive material, preferably an alloy of terbium, dysprosium and iron, of the general formula $Tb_x$, $Dy_{1-x}$ $Fe_{1.95}$ (where x may vary but is typically 0.3). An example of a suitable composition is sold under the trade name Terfenol D and is available from Etrema Products Inc, 2500 North Loop Drive, Ames, Iowa 50010, USA. The Terfenol D is usually cast in directionally solidified or single crystal form. It is possible to use magnetostrictive elements of other suitable alloys.

The valve wall 70 comprises any suitable low magnetic permeability material, for example stainless steel or titanium. The stainless steel preferably comprises 18 wt % chromium, 8 wt % nickel and the balance is iron, carbon and incidental impurities. The keeper comprises magnetically soft iron or magnetically soft ferrite.

In operation the current to the magnetic coil 72 is modulated at the appropriate frequency, amplitude and phase to reduce the combustion noise in the combustion chamber 28. The modulation of the current produces modulation of the magnetic field strength about a mean magnetic field strength and this produces modulation in the length of the magnetostrictive element 66 about a mean length. The modulation of the length of the magnetostrictive element 66 produces modulation of the gap between the valve stem 64 and the valve seat 62 and this modulates the fuel flow rate through the bore 63 in the valve seat 62. The fuel flow rate is controlled by the size of the gap between the valve seat 62 and the valve stem 64 and the diameter of the bore 63 through the valve seat 62.

The magnetostrictive element 66 is modulated at the frequency of the combustion noise generated in the combustion chamber 28. The combustion noise is generally in the frequency range 100 Hz to 2 kHz.

The present invention has the advantage that the magnetostrictive element 66 produces large forces for low applied voltages. A high voltage is an undesirable feature in a fuel control valve because it is a possible ignition source for any leaking fuel. The fuel control valve has the advantage that the magnetostrictive element is completely inside the valve wall and there are no moving seals in the valve wall and there are no flexible portions in the valve wall to reduce the possibility of fuel leakage. The magnetostrictive element is able to produce small, precise, high frequency displacements. The valve wall does not have any electrical wires passing through it to reduce the possibility of fuel leakage. The magnetostrictive element is able to vibrate at hundreds or thousands of Hz for short periods of time to break dirt and clear blockages in the fuel in the fuel control valve. A large diameter magnetostrictive element may be used so as to generate a steady state force sufficient to break dirt and clear blockages.

A problem with the use of a fuel control valve with a magnetostrictive element is that the alternating magnetic field generates waste heat due to hysteresis and eddy current losses.

Figure 5:
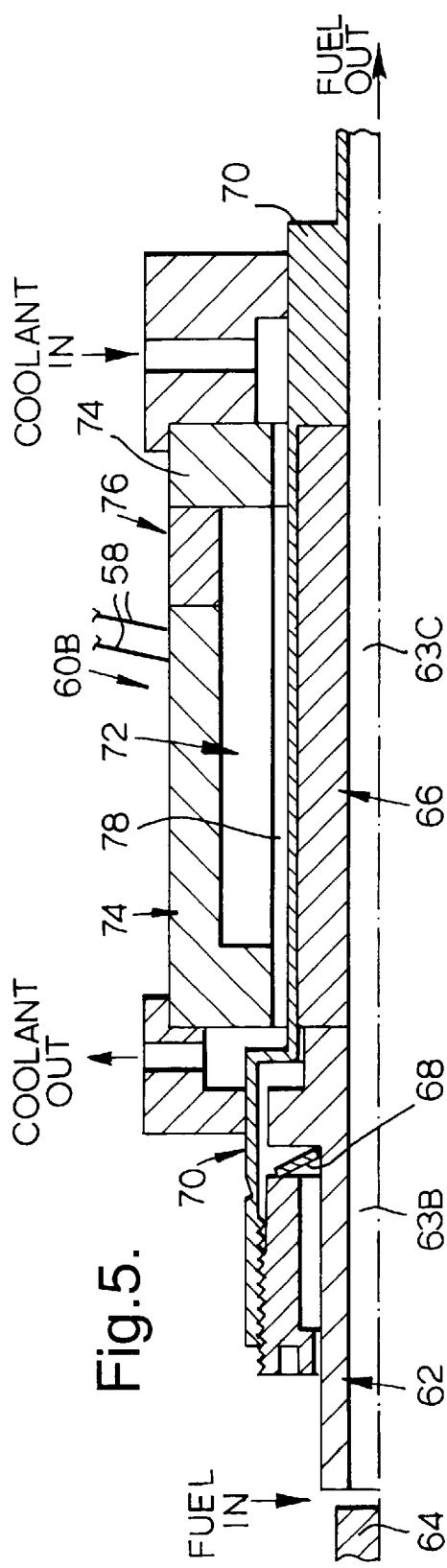
FIG. 5 is a cross-sectional view through a further fluid flow control valve according to the present invention.

Another fuel flow control valve 60B, as shown in FIG. 5, is similar to that shown in FIG. 4 and like parts are shown by like numbers. The fuel flow control valve 60B differs in that the valve seat 62 is movable towards or away from the valve stem 64 to control the fluid flow through the valve 60B. A magnetostrictive element 66 is arranged to move the valve seat 62 towards the valve stem 64 and biasing means 68 is arranged to move the valve seat 62 away from the valve stem 64. The valve seat 62 has a bore 63B and the magnetostrictive element 66 has a coaxial bore 63C for the flow of fuel into or out of the fuel control valve 60B. The fuel flow control valve 60B is provided with means to cool the fuel flow control valve 60B. The flow of fluid through the bore 63C directly removes heat from the magnetostrictive element 66. Additionally one or more passages 78 are arranged to extend parallel to the axis of the fuel control valve 60B between the valve wall 70 and the magnetic coil 72 and to pass through the keeper 74. A cooling fluid, for example air, flows through the passages 78 to remove heat from the magnetostrictive element 66 by conduction through the valve wall 70 and heat transfer into the fluid. The cooling fluid also cools the magnetic coil 72.

Figure 6:
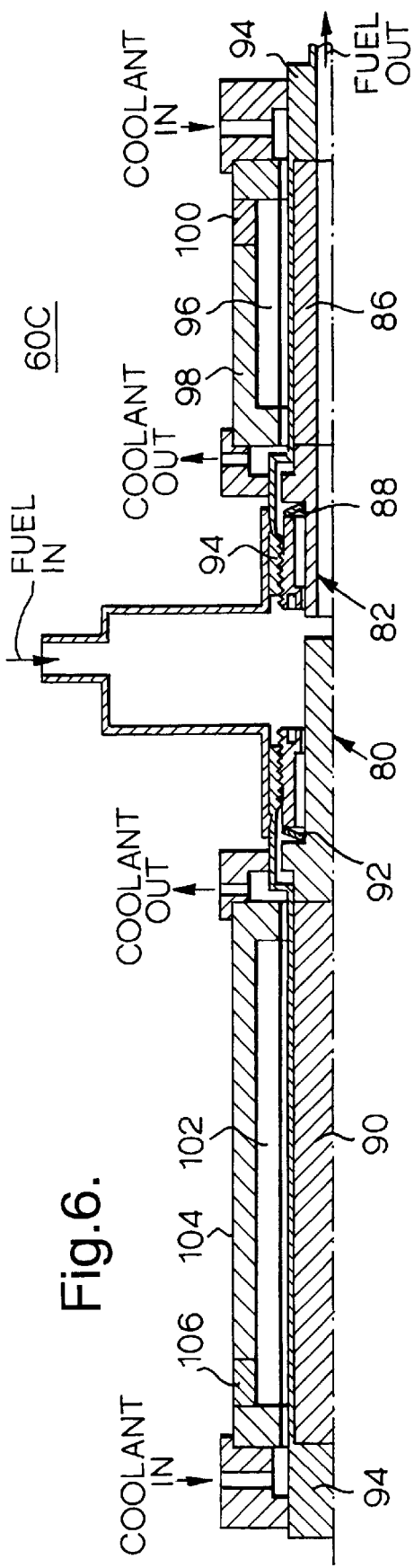
FIG. 6 is a cross-sectional view through another fluid flow control valve according to the present invention.
Figure 7:
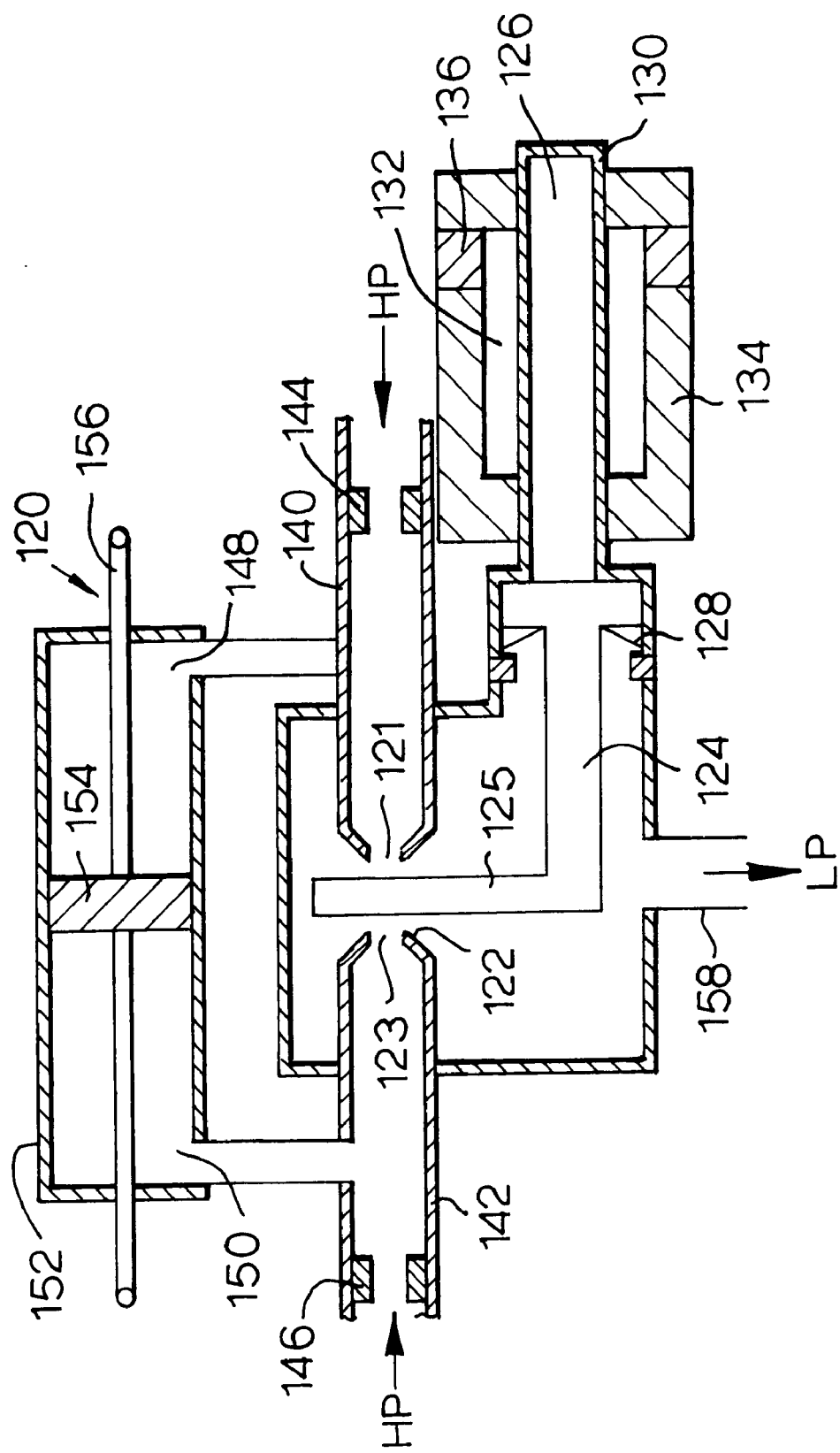
FIG. 7 is a cross-sectional view through a fluid flow control valve according to the present invention.

A complex fuel control valve 60C is shown in FIG. 6 and this comprises a valve stem 80 and a valve seat 82. The valve stem 80 is movable towards and away from the valve seat 82 to control the fluid flow through the valve 60C and the valve seat 82 is movable towards and away from the valve stem 80 to control the fluid flow through the valve 60C. A first magnetostrictive element 86 is arranged to move the valve seat 82 towards the valve stem 80 and a first biasing means 88 is arranged to move the valve seat 82 away from the valve stem 80. A second magnetostrictive element 90 is arranged to move the valve stem 80 towards the valve seat 82 and a second biasing means 92 is arranged to move the valve stem 80 away from the valve seat 82. A valve wall 94 encloses the valve stem 80, the valve seat 82, the first magnetostrictive element 86, the first biasing means 88, the second magnetostrictive element 90 and the second biasing means 92. A first magnetic coil 96, a first keeper 98 and a first permanent magnet 100 are arranged around the valve wall 94 axially aligned with the first magnetostrictive element 86. A second magnetic coil 102, a second keeper 104 and a second permanent magnet 106 are arranged around the valve wall 94 axially aligned with the second magnetostrictive element 90.

The second magnetostrictive element 90 is arranged to have a larger axial displacement than the first magnetostrictive element 86. The second magnetostrictive element 90 controls the mean fuel flow rate. The large displacement of the second magnetostrictive element 90 is produced by arranging the length of the second magnetostrictive element 90 to be longer than the length of the first magnetostrictive element 86. Alternatively a displacement amplifier may be used because the frequency of operation of the second magnetostrictive element 90 is up to 50 Hz. The first magnetostrictive element 86 has a smaller axial displacement than the second magnetostrictive element 90 but is operated at frequencies in the range 50 Hz to 3 kHz to achieve the reduction of the combustion noise.

The gap between the first and second magnetostrictive elements 86 and 90 is all but bridged by the valve stem 82 and the valve seat 80 to leave a small gap. The valve seat 82 has a shorter length than the valve stem 80 so that the valve seat 82 has a low mass to enable the first magnetostrictive element 86 to operate at high frequency.

Heat is predominantly generated in the first magnetostrictive element 86 because it operates at high frequencies.

If it desirable to remove heat from the fuel flow control valve 60C by the fuel then the fuel is supplied through bores in the valve seat 82 and the first magnetostrictive element 86, as shown in FIG. 6. If it is undesirable to transfer heat to the fuel then the fuel is supplied through bores in the element 80 and second magnetostrictive element 90 (not shown). In this case the element 80 becomes the valve seat and the element 82 becomes the valve stem.

A hydraulic servo-control valve 120 comprises a valve seat 122 and a valve stem 124 which is movable towards or away from the valve seat 122 to control the fluid flow through the servo-valve 120. A magnetostrictive element 126 is arranged to move the valve stem 124 towards the valve seat 122 and biasing means 128 is arranged to move the valve stem 124 away from the valve seat 122. A wall 130 encloses the valve stem 124, the biasing means 128 and the magnetostrictive element 126. A magnetic coil 132 is arranged around the wall 130, a keeper 134 is arranged around the wall 130 and a permanent magnet 136 is arranged around the wall 130. The valve seat 122 has a bore 123 for the flow of hydraulic fluid out of the hydraulic servo-valve 120. The biasing means 128 comprises a spring, preferably a belleville spring.

The wall 130 is cylindrical and the valve stem 124 and magnetostrictive element 128 are arranged coaxially within the wall 130. The magnetic coil 132, the keeper 134 and the permanent magnet 136 are arranged coaxially around the wall 130. The magnetic coil 132, the keeper 134 and the permanent magnet 136 are annular. The magnetic coil 132, the keeper 134 and the permanent magnet 136 are arranged axially in alignment with the magnetostrictive element 126 so that changes in the magnetic field from the electromagnetic coil 132 produce changes in the axial length of the magnetbstrictive element 126. The keeper 134 completes the DC magnetic circuit produced by the permanent magnet 136 and the AC magnetic circuit produced by the magnetic coil 132. The permanent magnet 136 produces a biasing magnetic field on the magnetostrictive element 126.

The valve stem 124 has a radial arm 125, which is arranged, between two opposed valve seats 122 and 121 of the hydraulic servo-valve 120. Thus movement of the valve stem 124 towards the valve seat 122 reduces the flow of hydraulic fluid out of the valve seat 122 and increases the flow of hydraulic fluid out of the valve seat 121. On the other hand movement of the valve stem 124 away from the valve seat 122 increases the flow of hydraulic fluid out of the valve seat 122 and decreases the flow of hydraulic fluid out of the valve seat 121. The hydraulic fluid flowing out of the valve seats 121 and 122 flows through pipe 158 to a low-pressure drain. The valve seats 121 and 122 are provided in pipes 140 and 142 respectively. The pipes 140 and 142 are also provided with restrictions 144 and 146 respectively. The pipes 140 and 142 are connected to chambers 148 and 150 respectively on opposite sides of a piston 154 located in a cylinder 152. The piston 154 is connected to a shaft 156 which provides movement of a device (not shown). Thus a small movement of the valve stem 124 is used to provide larger movement of the shaft 156.

Other shapes of valve stem and valve seat may be used.

It is possible to minimise combustion noise by providing an inner pipe within the fuel pipe from the fuel injector to the valve seat such that there are no step changes in diameter to reflect acoustic waves.

Although the invention has been described with reference to a fuel control valve the valve may be used to control the flow of other fluids. The valve may be used to control the flow of lubricants in a gas turbine engine, diesel engines, petrol engines, other engine or other machines. The valve may be used to control the flow of hydraulic fluid in aircraft, gas turbine engines, diesel engines, petrol engines, other engine or other machines or vehicles etc.

I claim:

1. A fluid flow control valve comprising a valve seat, a valve stem, the valve seat has a passage therethrough for the flow of fluid, the valve stem and the valve seat are relatively movable towards or away from each other to control the fluid flow through the valve, a magnetostrictive element arranged to move the valve stem and the valve seat towards each other, biasing means to move the valve stem and the valve seat away from each other, a valve wall enclosing the valve stem, the valve seat, biasing means and magnetostrictive element, a magnetic coil arranged around the valve wall, a keeper arranged around the valve wall and a permanent magnet arranged around the valve wall.

2. A valve as claimed in claim 1 wherein the valve wall is cylindrical.

3. A valve according to claim 1, wherein the valve seat, the valve stem, the magnetostrictive element, the magnetic coil, the permanent magnet, the keeper and the valve wall are arranged coaxially.

4. A valve according to claim 1, wherein the biasing means comprises a spring.

5. A valve according to claim 4 wherein the spring is a belleville spring.

6. A valve according to claim 1 wherein the magnetostrictive element comprises an alloy of terbium, dysprosium and iron.

7. A valve according to claim 1 wherein the valve wall comprises a low magnetic permeability material.

8. A valve according to claim 7 wherein the low magnetic permeability material comprises stainless steel or a titanium alloy.

9. A valve according to claim 8 wherein the stainless steel comprises 18 wt% chromium, 8 wt% nickel and the balance is iron, carbon and incidental impurities.

10. A valve according to claim 1 wherein the permanent magnet is annular.

11. A valve according to claim 1 wherein the keeper comprises magnetically soft iron or magnetically soft ferrite.

12. A valve according to claim 1 wherein the valve stem is movable towards or away from the valve seat to control the fluid flow through the valve, the magnetostrictive element is arranged to move the valve stem towards the valve seat, the biasing means is arranged to move the valve stem away from the valve seat.

13. A valve according to claim 1 wherein the magnetostrictive element operates at a frequency in the range 50 Hz to 2 kHz.

14. A fuel flow control for a combustion chamber comprising at least one fuel injector to inject fuel into the combustion chamber, a fuel supply to supply fuel to the at least one fuel injector, at least one pressure transducer arranged to send a signal corresponding to the pressure in the combustion chamber to a control device, the control device is arranged to send a signal to a fuel flow control valve to control the fuel supply to the at least one injector to minimise noise or vibration in the combustion chamber, the fuel flow control valve is a valve according to claim 1.

15. A gas turbine engine comprising a fluid flow control valve as claimed in claim 1.

16. A gas turbine engine comprising a fuel flow control for a combustion chamber as claimed in claim 14.

* * * * *